United States Patent [19]
Pryor

[11] Patent Number: 4,769,700
[45] Date of Patent: Sep. 6, 1988

[54] ROBOT TRACTORS

[75] Inventor: Timothy R. Pryor, Tecumseh, Canada

[73] Assignee: Diffracto Ltd., Windsor, Canada

[21] Appl. No.: 651,325

[22] Filed: Sep. 17, 1984

Related U.S. Application Data

[63] Continuation-in-part of Ser. No. 323,395, Nov. 20, 1981, Pat. No. 4,482,960.

[51] Int. Cl.⁴ .............................................. H04N 7/18
[52] U.S. Cl. ..................................... 358/107; 358/93; 356/4; 356/357
[58] Field of Search ................ 318/560; 364/424, 165, 364/444, 456, 449, 561; 172/4.5, 5, 6; 37/DIG. 1; 250/202; 358/107, 93, 103, 108, 139, 106, 903; 356/372, 378, 1, 4, 383, 5

[56] References Cited

U.S. PATENT DOCUMENTS

| | | | |
|---|---|---|---|
| 3,978,324 | 8/1976 | Rayner | 358/107 X |
| 4,210,930 | 7/1980 | Henry | 358/103 |
| 4,232,336 | 11/1980 | Henry | 358/107 X |
| 4,460,921 | 7/1984 | Henry et al. | 358/107 |
| 4,490,038 | 12/1984 | Theurer et al. | 356/4 X |

FOREIGN PATENT DOCUMENTS 0202011  11/1984  Japan ................................... 358/107

Primary Examiner—Howard W. Britton
Assistant Examiner—Victor R. Kostak
Attorney, Agent, or Firm—Larson and Taylor

[57] ABSTRACT

Disclosed is an electro-optical and microcomputer based method and apparatus for automatically guiding tractors and other farm machinery for the purpose of automatic crop planting, tending and harvesting. A target is preferably located at one boundary of the field which serves as a reference. The position of the machinery in the field is determined by electro-optically sensing the target with a sensor located on the machinery. A desired trajectory for the machinery is then determined and the machinery is steered automatically along this trajectory.

3 Claims, 7 Drawing Sheets

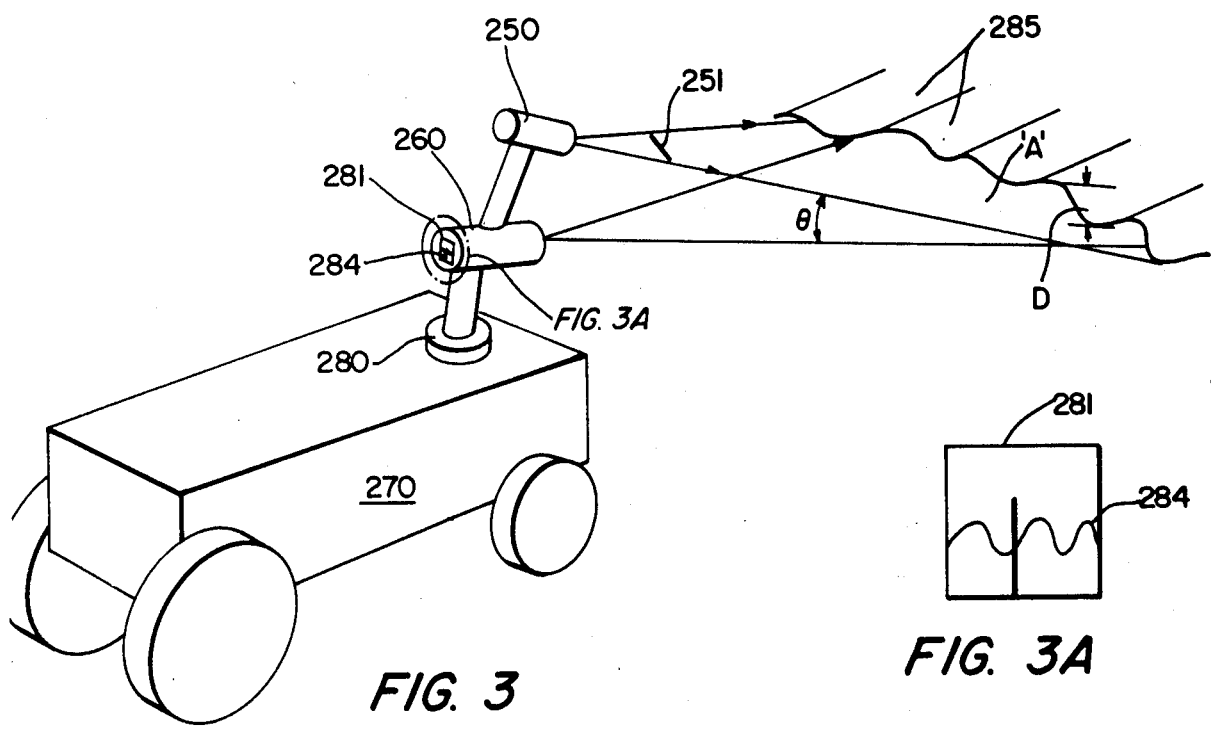
FIG. 3
FIG. 3A
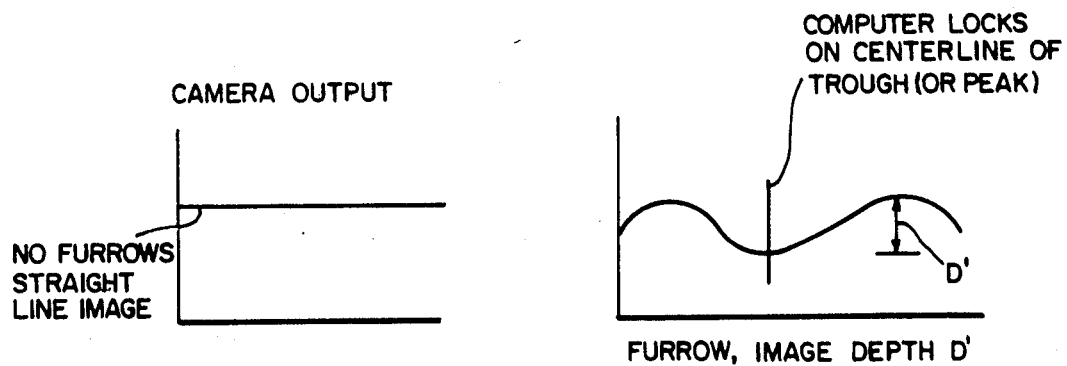
FIG. 3B
FIG. 3C

FRUIT WITH PROJECTED GRID LINES IMAGED BY CAMERA 811.

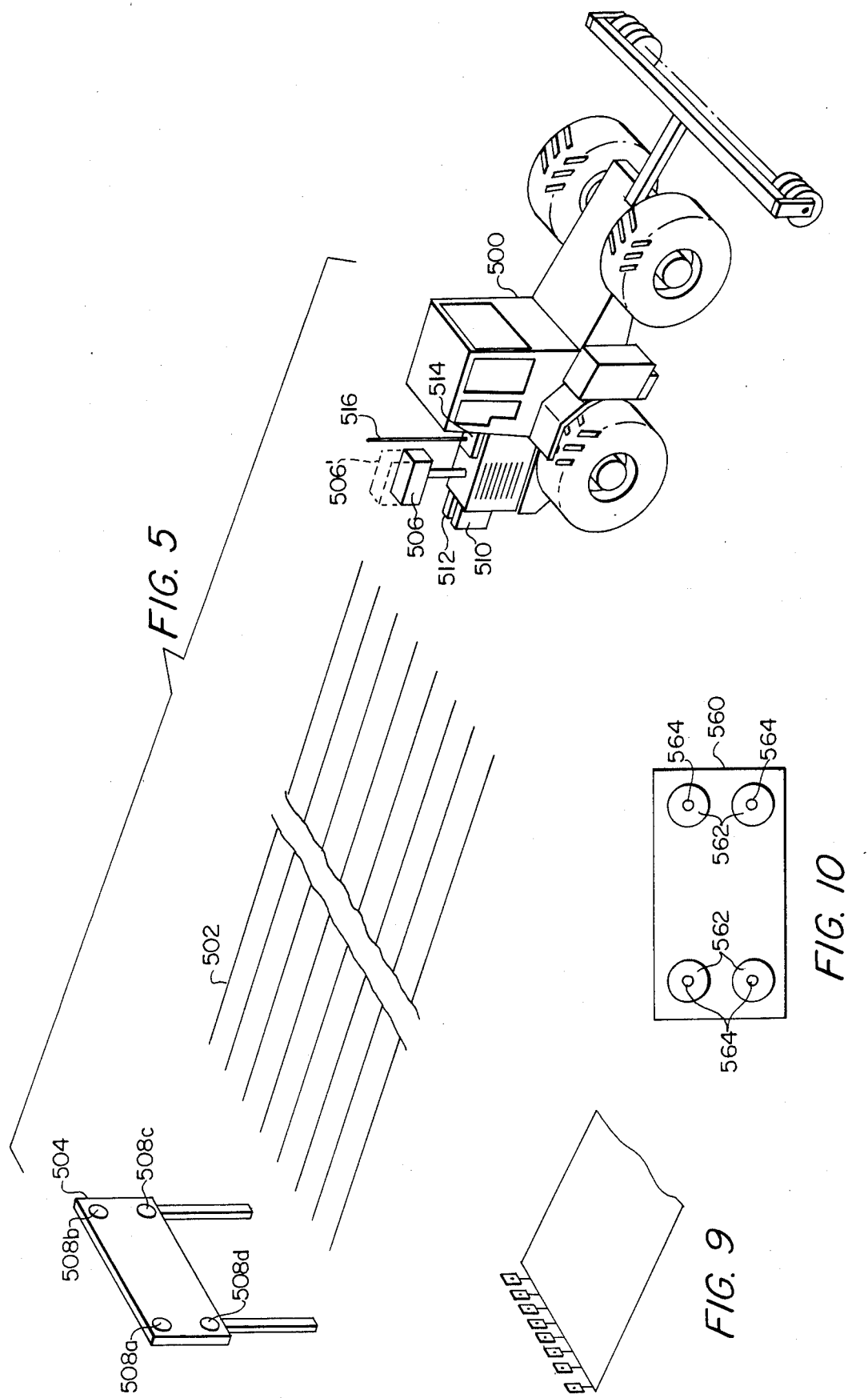

ROBOT TRACTORS

This is a continuation-in-part of application Ser. No. 323,395 filed 11-20-81, now U.S. Pat. No. 4,482,960.

BACKGROUND OF THE INVENTION

This invention is directed at automatic guidance of tractors and other farm machinery so as to minimize the human labor required for farming as well as to provide vastly increased equipment utilization. This would tend to provide higher outputs for any given equipment base and in some cases, can actually allow some jobs to get done that could not be done properly, given normal equipment.

SUMMARY OF THE INVENTION

For example, in essence, it is proposed to use a tractor based automatic electro-optical guidance system and microcomputer implementation to guide the tractor along the straight rows of the crop whatever it is. The tractor would run unattended with a monitoring device remotely located to tell how the tractor is progressing and, if desired, present a visual display as seen by the guidance camera of the tractor. It is estimated that tractors could run all night long in such a mode given high sensitivity cameras operating under moonlight or starlight or what's more likely the coupling of sensitive cameras with headlights from the tractor.

The ability to operate at night immediately provides a maximal utilization of equipment cost since it can be utilized 24 hours a day rather than just 12 or 16 at most. Naturally, it also saves considerable labor (which also may be unobtainable at any price in certain locales) simply because of the fact that no one is required to ride the tractor. Finally, it helps change the agricultural job from one of the lower level task actually a rather high level task of maintenance and repair of sophisticated machinery.

The ability to plow all night without fatigue cannot be stressed too much since this allows one to bring in crops in short periods of time. For example, before storms, or before certain other temperature or climate conditions arrive or cease. It also obviously allows 24 hour usage of equipment. It is considered that one might use guidance systems coupled to any particular type of tractor which would be removable and could be rented to people in different climatic areas that would have requirements at different times. This would allow the maximum cost effectiveness of the sensor and computer hardware to be shared amongst more users.

To conclude, one of the big incentives to develop such a unit is that it provides considerable improvement in the cost effectiveness of farm equipment through:

1. Reduction of scarce and expensive manual labor involved in driving the equipment.
2. Increased equipment utilization provided by its ability to operate at night without fatigue.

The cost of such automatic control equipment can be offset, at least in part, by certain savings in the tractor construction that are necessary because of the presence of the manual operator. These include:

(a) Cab
(b) Roll over protection
(c) Air conditioning and heating for the cab.
(d) Soft seats, stereos and other amenities for the operator.
(e) Elimination of the steering wheel (which would probably need to be retained in some form, however, for manual backup) and other such things could also be considered. The whole shape of the tractor or combine might be altered to have a low sillouette etc.

Key items in the invention are as follows:

1. A tractor or other farm machinery capable of accepting inputs and responding to inputs to allow it to be steered, throttled and/or braked, and possibly shifted into reverse as well as forward plus start and stop.
2. One or more targets located at the boundaries of the field.
3. A solid state camera or other electro-optic system capable of operation in the tractor environment which observes the target and determines the exact position of the tractor in the field.
4. A microcomputer system coupled to the camera and to the tractor controls which interprets the signals from the camera and steers the tractor along a desired trajectory in the field.
5. For night use, a lighting system for an image intensification system for the target.
6. An optional camera system for observing ahead of the tractor.

BRIEF DESCRIPTION OF THE DRAWINGS

FIG. 3 is a schematic elevation prespective view of an alternative embodiment of the present invention.

FIG. 3A is an enlarged view of the output of the array depicted in FIG. 3.

FIG. 3B is a schematic representation of the output of an array where no furrows are present.

FIG. 3C is a schematic representation of the output of an array where furrows are present and one is being followed.

FIG. 4B is a diagrammatic illustration of a portion of an embodiment of the invention directed to picking fruit or the like.

FIG. 5 is a diagrammatic representation of a tractor and guiding system according to an alternative embodiment of the present invention.

FIG. 9 is a diagrammmatic representation of still another type of target board for a field according to the tpresent invention.

FIG. 10 is an elevation view of a preferred embodiment of a target according to the present invention.

DETAILED DESCRIPTION OF THE PREFERRED EMBODIMENT

Figure 1:
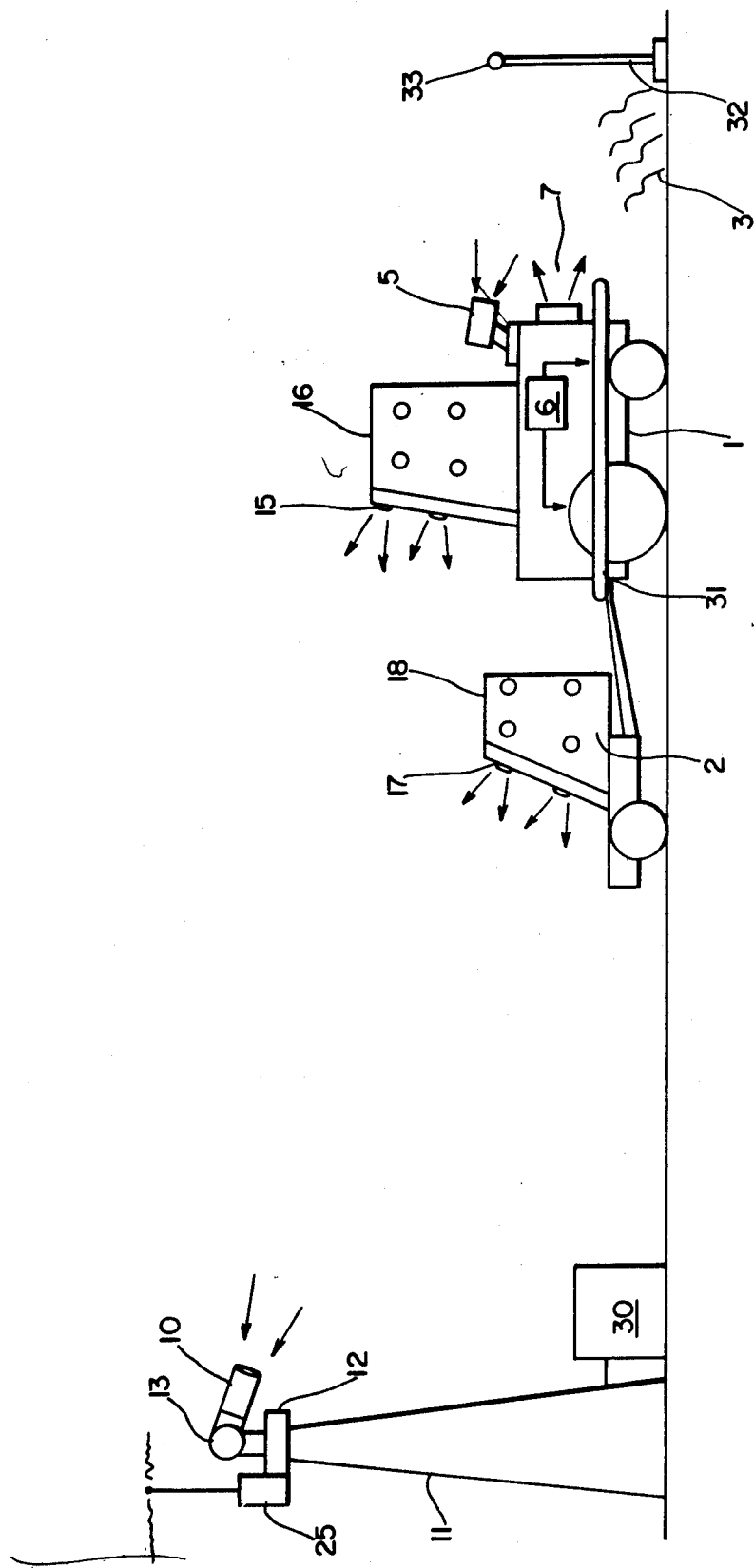
FIG. 1 is a schematic representation of an elevation view of a robot tractor according to the present invention including an external reference.

FIG. 1 illustrates a basic embodiment of the invention. A farm tractor 1, pulling plow 2, automatically is guided along rows of furrows 3 using solid state TV camera 5 whose data is processed by microcomputer 6 and used to control the steering and throttle of the tractor. Flood light 7 is useful for night operation.

The camera views ahead and to one side of the tractor, particularly the rows previously dug which the microcomputer senses by the varying gray level (or color if so equipped) and determines a parallel path. When the tractor has reached the end of the furrowed area, it executes a pre-programmed 180° turn, locks on the furrows just plowed and proceeds again.

Optionally or alternatively, a second camera 10 is utilized ideally located in a high area (e.g. a tower 11) at the edge of the field to track the tractor and provide an external reference frame for its operation. Suitable sets of targets 16 and 15 are provided on the tractor (and optionally targets 17 and 18 on plow 2). Each set is composed of typically 3-4 points such as white spots on black background. From any viewing angle, the targets are ideally visible to allow range, and attitude as well as location to be determined via triangulation. Targets can also be made up of pulsing lasers, LEDs or flash guns visible at night or in adverse weather conditions.

Many electro-optical sensors have recently been described by the inventor in copending application which may be of use herein. These are incorporated by reference.

1. Electro-optical sensor systems for thread and hole inspection Ser. No. 64,867, now U.S. Pat. No. 4,315,688.

2. Method and apparatus electro-optically determining the dimension, attitude and location of objects: Ser. No. 34,278, now U.S. Pat. No. 4,373,804.

3. Method and apparatus for determining physical characteristics of object and object surfaces: Ser. No. 15,792, now U.S. Pat. No. 4,305,661.

4. New photodetector array based optical measurement systems: Ser. No. 163,290, now U.S. Pat. No. 4,394,683.

5. Electro-optical inspection, Ser. No. 269,614 which is a continuation of Ser. No. 073,226, now abandoned.

6. Co-ordinate measuring method and device, Ser. No. 560,259, which is a continuation of Ser. No. 207,081, now abandoned.

7. Electro-optical sensors with fiber optic bundles, Ser. No. 173,370, now U.S. Pat. No. 4,441,817.

8. Electro-optical surface roughness measurement and control: Ser. No. 240,459.

9. Apparatus for determining dimensions, Ser. No. 134,465, now U.S. Pat. No. 4,403,860.

10. High speed electro-optical inspection, Ser. No. 525,801 which is a continuation of Ser. No. 203,866, now abondoned.

11. Fiber optic based robot controls, Ser. No. 200,401.

12. Electro-optical sensors for machine tool and robotic inspection: Ser. No. 247,399.

Optional but recommended are safeguard systems such as buried wires around the field, bumpers on the tractor, etc.

In operation, the farmer would essentially program the tractor, pulling a hoe, to go back and forth in a regular pattern to furrow the field. In a second 'fence line' mode, this would be done at first by guiding the tractor along the edge of the field. The guiding could be done optically using, let us say, a fence line (either normal fence or better, composed as well with flashing lights etc.) or through use of a buried cable. If done optically, the camera would sense the line of the fence and keep the tractor a constant distance from that line. When the programmed end of the field was reached as sensed from an odometer, (or if slippage was taking place from other types of sensors interpreting the velocity of forward motion, or for that matter, from sensed edges of the field picked up on a fence line, for example), the tractor then is caused to turn 180° and head back down parallel to the row just hoed.

It is the job of the sensor to guide the tractor down parallel to the row hoed and this is done by sensing what the hoed row looks like, similar to that done by the human. It is obvious that the sensing would be somewhat different depending whether one was sensing for furrows, corn stocks or whatever. However, basically, the idea is to track on a macroscale, the line of the furrow or corn row etc. and not look too closely at the minor detail. This can be done with a relatively simple computer algorithm operating on the scan data from the camera.

The tractor then, after executing the 180° turn, goes down following the row to the end, whereupon it senses that the fence line is approached and makes another 180° turn in the other direction and proceeds. It does this until a fence line can no longer be seen or until a pre-programed number of turns have been made. Comparison with an odometer gives a rough idea of that as well. Optionally, external reference frames from overseeing cameras can be used, eg. 10, described below.

For safety sake, to keep the tractor from running away in case of failure, there are two possible things of many that can be done even though totally unattended. The first thing is to employ a simple bumper system around the tractor such as used by toys, etc. In this case, a limit switch where, if the bumper contacts anything, the tractor stops and a warning signal is flashed back to the central control point such as the farmer's home. Position of the bumper as low as possible would seem to preclude most types of foreign objects being run over or the tractor from going through fences and so on. Naturally, if the field is fenced, the tractor would automaticlly stop upon hitting the fence in this mode.

A second safeguard is to run buried cable around the field and have a magnetic sensor looking for the cable. The cable could actually be charged electrically such that an unmistakable field signal was obtained. This would act as a deterent that would allow one to stop the tractor before arriving at a fence line for example, and would be a double check on the system. It should be noted that the guard or bumper all the way around the tractor does provide an easy way to stop the tractor by just coming up and touching the guard.

It is envisioned, at least during daylight hours, that on large plots, multiple tractors might be plowing at once in which case it would be economic to have a central control point possibly in a tower-type location where a single operator could have an overview of all the tractors plowing the various fields. This coupled with feedback from the tractor would allow him to know whether they are running properly etc. He could naturally even see the furrows being plowed and this would give him a good feel for what was going on. It could even be noted that since the camera is capable of giving the images out that the total image from the camera, TV type could be transmitted on short range television to the monitors in the control tower so that every tractor in the field would have a picture of what it was seeing presented.

There would be other safeguards also incorporated into the microcomputer. For example, it is obvious that in feeding correction commands relative to going down furrows, that there would never be anything like a 90° turn for example, except at the end of the row. Therefore, correction signals would be allowed, and if the tractor kept turning while still receiving such correction signals, it would actually stop. This would indicate that a malfunction was occurring in the furrow sensing circuit or something was amiss in the field of view.

The pricing advantages of this particular approach are quite interesting. First, it is estimated that the control system might, in volume, cost no more than $20,000, complete. Since a deluxe cab with air conditioning, stereo, etc. can cost $8,000 and would not be required in this case, it is clear that the net cost may only be in the $10–$12,000 range. This would be easily made up in the first year of operation without an operator — nevermind any advantages in increased equipment utilization at night and so forth. Therefore, the economics of this can be compelling indeed. It should be noted that farm machinery is not utilized totally throughout the year and that people hired are kept on for tasks to be completed later. Therefore, the replacement of labor time while on the tractor is not the total labor saving cost.

The Control System

The unit, in certain versions, breaks down into the following categories of sub systems:

1. The optical sub system is used to scan and analyze the data from the field ahead of the tractor (or combine etc.). This would typically be a solid state TV camera connected to special hardware image circuits and finally into the system control microcomputer. There might even be in this case, two microcomputers, one strictly for image data, the other for system control.

2. The steering and braking sub system, which would essentially take the inputs from the system microcomputer including the processed image data and preprogrammed data, plus any external limit data and cause the tractor to either stop, turn, or what have you. Conceivably, the braking sub system, in this case, could be extremely simple.

3. The system control microcomputer is used to analyze the optical signal inputs and convert them into the appropriate commands to the machine as well as to accept preprogrammed information concerning the plowing strategy to be followed. This could include the direction to be taken, the program limits of the outline of the farm etc.

It is clear that the degree of programmability of this system relates in large measure to the ability to tell where one is at on the farm. This, in essence, requires either some sort of accurate odometer (known to be difficult to achieve) or a means of using the optical sub system or some other system to create distance command inputs.

One such distance type input that has been suggested is to use radio or ultrasonic transmitters to phase the data in the direction finding context which would allow the tractor to have a fix on its bearing in the field at any given time. This could well be desirable and would also provide a limit on the tractor's motion preventing runaways. Another approach is using an external optical reference frame as discussed below.

4. Visual monitoring sub systems. It is conceivable that it might be desirable to radio back the visual image data to some centralized monitoring facility. This monitoring facility could simply be a farmer's home TV set. In the utimate case, a miniature TV transmitter could be utilized to directly transmit the image data to provide a "tractor's eye" view of the field. Superimposed on the image would be pertinent data such as location coordinates. Superimposed by the receiver microcomputer could be a map of the farm on the TV set showing the tractor's progress. This really costs little more than the additional transmission cost as well as decoding cost at the TV set.

5. Basically, it is thought that the guidance system would best function by actually viewing the field to be plowed including the previously plowed furrows, etc. as well as possibly auxiliary marking unit at the end of the field to allow the tractor to be sighted and to serve as indicators for turn around.

The problems as perceived in the operation of this tractor are as follows:

1. Perfection of the optical and control system such that the tractor does a good job without ruining crops by running across rows, etc.

2. Prevention of runaways in which the tractor leaves the bounds of the farm or the field being plowed or does some other strange maneuver, such as going around in circles, etc.

3. Prevention where at all possible of runover conditions. One example is a drunken farm hand coming into the field, falling asleep and being run over by the tractor an hour later say. This latter is a rare potential case, but one which needs to be examined. So is the case of vandalism, particularly when running at night.

Various means are possible to largely preclude these undesirable events from happening. These include at a minimum, the following:

1. Bumper type limit switches to physically shut the tractor off if the outer bar comes in contact with a fence, person etc. (FIG. 1, item 31)

2. Sensors to cut the tractor off if it strays beyond given bounds. These sensors can react to buried cables or optically to laser beams, for example, deliniating the farm or can even use the system visual guidance to track stakes etc. For example, fence 32 in FIG. 1, which may also have flashing light 33 for greater visibility.

3. The computer can be programmed to guard against any control commands that would cause circular motion or some other strange motion regime not called for in normal operation.

Naturally, any of these events, if it happens, should cause an alarm to be sounded at the control center. One more technique that can be used to prevent accidents is that if anything resembling a human gets in the frontal path of the tractor vision system, or for that matter, anything that is not pre-programmed to be typical of the farm to be plowed, the computer senses this. This would easily allow, for example, a standing person, a fence post, etc., to be discriminaited against and the tractor shut down until that object was no longer in view.

One other obvious possibility for causing malfunctions is vandelism in which parties could come and try to trick the tractor by blocking the vision, etc. These things can probably be interlocked to the point where the tractor sub systems are simply shut down and the alarm rings.

In the description above the general concept of the guided tractor has been put forward. It is clear that in the form shown in the FIG. 1, the determination of the position of the tractor in the field is based, at least in the tracking of rows, on processing of the images obtained by the matrix camera. This matrix camera image processing essentially takes two forms.

The first is the deliniation of the points in the image themselves. In other words, the features that are going to be used in order to tell the rest of the processing how to adjust the tractor. Naturally, like the image to the person, it is composed of gray level lights and darks (with or without color). Processing, such as that shown in a copending application (now U.S. Pat. No. 4,394,683) of which this inventor is one of the the inventors, does provide the circuitry for two axis image mensuration of either spots or edges of objects.

Clearly, any such real time deliniation of where certain meaningful spots and edges are saves a vast amount of computer data processing for the tractor and can be crutial if quick maneuvers are required where there is simply no time to process data in any great degree. The tractor case is one where at certain times quick maneuvers are used but for long distance tracking of a single row, rather long processing times can be used to assure that the row is being carefully followed.

The direct image data that consists of essentially spots is, for example, rows of corn which tend to look bright with dark areas in between. In fact, rows of anything somewhat fit this bill and yield a modulation of points that can be sensed.

It is however desirable according to the invention, to show some additional ways of sensing without relying on gray scale or color images entirely.

Figure 2A:
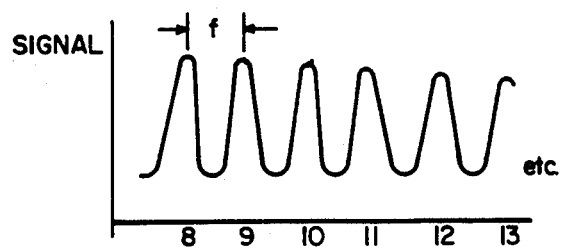
FIG. 2A is a schematic representation of the output signal of a detector viewing a row of corn stalks.
Figure 2:
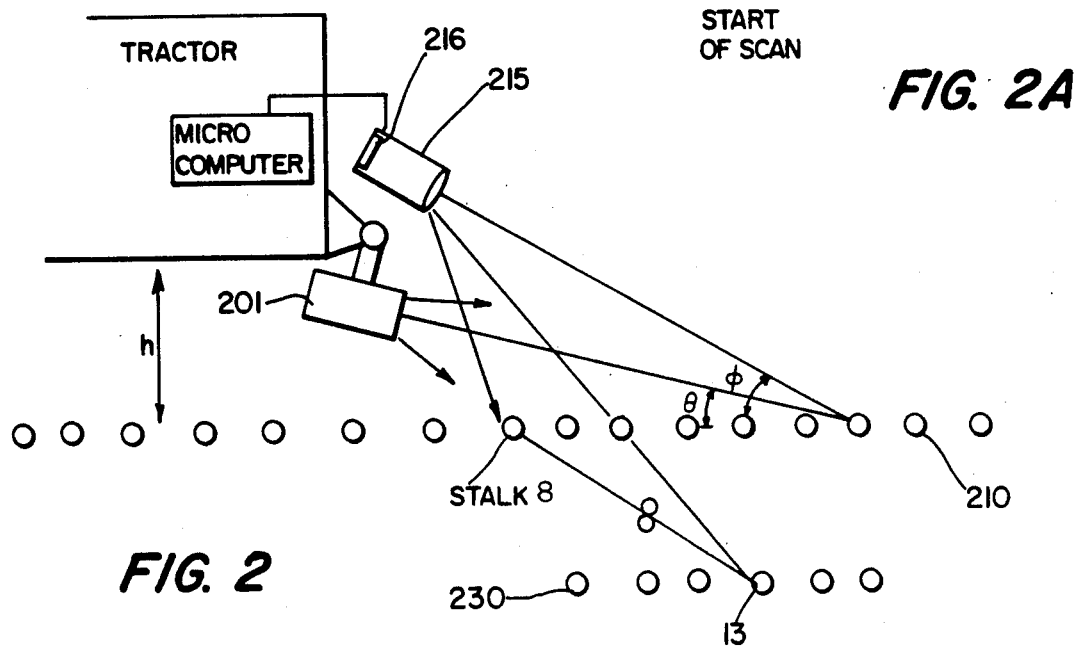
FIG. 2 is a schematic plan view of a tractor following a row.
Figure 2C:
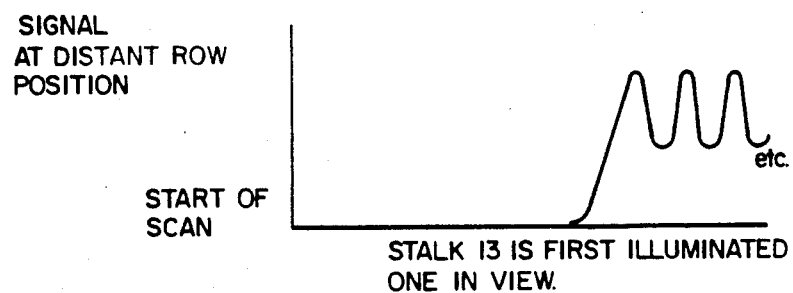
FIG. 2C is a schematic representation of the output signal of a detector viewing a second and inwardly spaced row of corn stalks.

Consider FIG. 2. This shows a projector of light 201 throwing a fan of light out centered roughly on angle θ from a row of cornstalks 210. The image of the stalks is viewed by a matrix array camera or linear array photo diode array camera 215 located at a larger angle φ. This particular sensing is typical to that used by the inventor for sensing of screw threads in holes and it is interesting to note the evenly planted corn in many respects produces images like those of the screw threads when illuminated at an oblique angle such that shadowing occurs between the stalks.

The signal that comes off array 216 under these conditions is proportional to the spacing of the corn. It is also proportional to the distance of the corn from the tractor. Clearly, there is a particular preferred image frequency that results when the tractor is pointed parallel to the row. This is sensed by the detector 215 and used to orient the tractor both in spacing from the row (which is in a sense the position of a signal burst in the camera field) and in parallelism to the row (which is related to the frequency). This output is depicted in FIG. 2A.

Quite clearly, if the tractor goes slightly off the row to the left as shown, the signal drops to zero and becomes totally out of focus. If the tractor veers to the right too much, the signal also goes out of focus and the distance illuminated becomes foreshortened. In either case, one has a certain way of telling that the tractor is not too much deviated.

A second problem in the field is tracking a furrow. In the alternative embodiment of FIG. 3, a light source unit 250 above and to the front of the tractor 270 projects a line 251 in front of the tractor that the camera 260 can image from an angle included. It is noted that this camera can be the same as camera 215 above if this camera is sufficiently pointed in the forward direction. It is also of interest to think of a camera 215 on a rotary mount 280 that can point in more than one direction with the light projector 201 either also movable or remaining fixed. Naturally, there is also the possibility of multiple cameras which is discussed below in more detail.

In any case, it is of interest to consider the projection of a line of light in front of the tractor to illuminate the furrows. The matrix array 281 then looks at the image of the line of light 284 on the furrows 285 which becomes distorted due to the shape of the furrow. As shown in FIG. 3C, by interrogating the matrix array, one can determine very roughly the shape and depth, D, of the furrow cross section and particularly lock on to a tracking signal that keeps the center of the array let us say centered on a particular furrow, "A". If no furrows are present, the output is as shown in FIG. 3B.

The readout of the matrix array 281 (shown in greater detail in inset FIG. 3A) finds the center of the line projection which can be done very neatly using the second differential circuitry of a referenced co-pending application (now U.S. Pat. No. 4,394,683).

As an alternative arragnement, a grill of parallel lines can be projected which can be sensed. Although this does not seem to provide any additional data on the furrow, it can be used in case there are giant dropouts in the furrows so that one would always have at least one line on the screen. There are also other advantages of grill lines for looking at other things such as more complicated contours as in pickers which are described below.

It should be noted that suitable light projectors include halogen lamps with slits or grills in front of them or, as in the FIG. 2 case of light projector 201, with just a lens in front. Naturally, in the grid projection case, it is of interest to focus the line to as small a zone as possible out in front of the tractor. This is because the included angle at the distance one would like to see is relatively limited between the grid projector and the camera. For this reason one would like to locate the two as far apart angularly as possible and this can mean a relatively tall pole or support bridge above the tractor holding the projection or receiving unit. There is nothing per se wrong with this, other than it looks odd. This support too can hold the targets for the external guidance described below.

The further use of projecting multiple lines is that in extremely rough areas this allows at least one of the lines to be observed as was pointed out. In other words, one would always scan let us say the average of 3 or 4 lines to determine an instantaneous center point between them rather than just lock the tractor onto one particular deviation point of a section of the furrow.

Also described in a copending application (Ser. No. 200,401) is the use of multiple sensors reading into one matrix photo diode array. Particularly, this was described relative to even very inexpensive area based fiber optics in the application copending. It has also been discussed with respect to robot control systems and both of these discussions are apropos here.

In the case of the tractor guidance problem, multiple sensors can be utilized having different functions to play. For example, the one looking at the furrow projection might not be the same as, for example, the one looking at the corn row signatures. Indeed, with available matrix photo diode arrays in the 500×300 element range, it is possible to share such a sensor with multiple image data gathering points via fiber optics.

The fiber optics utilized could be of the coherent type or waveguide type, when available, which would allow the image to be transmitted. Clearly, this would be required in the furrow case but a linear ribbon cable could possibly be used in the corn row case of FIG. 2. In any case, it is intended that this invention should disclose the use of such coherent fibers for use in obtaining multiple points of data with respect to the operation of the tractor; and particularly into viewing for different features at different angles around the tractor, but, of course, particularly ahead and behind.

The advantage of using the fibers even on multiple arrays is that the central processing unit can be located remotely in the base of the tractor with no electronics anywhere around.

It is also of considerable use to flash light sources which can achieve very high signal to noise ratios and as well achieve non blooming of the camera. The problem comes in that the operation is assumed during sunlight when projection of any auxiliary light would be very difficult from a signal to noise basis. To some degree, night time operation is even better in this regard.

Because of the sunlight level, one might have to rely on data from the gray scale image with only seldom getting data from the light so projected. This is, of course, unless one uses a laser as a light source in which case filtering can also be done on a wavelength basis.

Figure 2B:
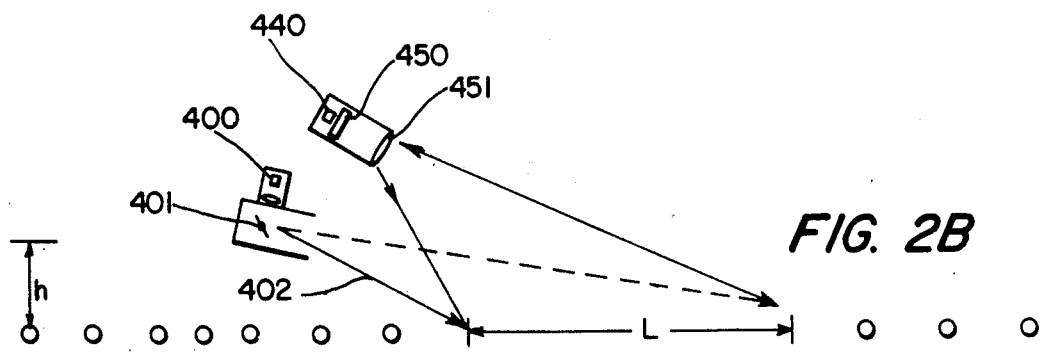
FIG. 2B is a schematic plan view of a laser scanning embodiment of the present invention.

It is of interest now to consider utilizing a scanning laser beam as opposed to the camera and projection of FIGS. 2 and 3. In the FIG. 2B case, for example, the projector unit 201 is replaced by a laser light source such as a CW diode laser 400 or HENE gas laser which has a small oscillating mirror 401 in front of it. This unit then scans the laser beam 400 up and down the fan width over distance "L" (equal to the previous fan width of projector 201) producing the same sort of signature. The detector in this case, however, does not have to be a matrix array and can be a simple photo detector 440 saving some cost. There would seem to have some application for this because of the higher signal to noise of the laser beam, through interference filter 450. Lens 451 has a field of view which is equal to "L" at the nominal distance "h" to the row adjacent. The interference filter 450 is also useful in cameras 10, 5, and 215, if laser light sources are used.

In the FIG. 3 case, the same holds true. The bar in this case would be a scanned laser beam and in this case the detector array, which like the detector 201 would have an interference filter in front of it to discrimate from sunlight, would only now have to be a linear detector array in order to find the position of the furrow. In this case, the furrow position is scanned along and picked off accordingly. Even then though, the power of commercially available lasers is relatively low to where this is quite difficult to do at the ranges desired. Modulating the light souce and demodulating the detector signal then is perhaps required in order to achieve sufficient background noise discrimination.

The targets 15 and 16 (and 17 and 18), shown in FIG. 1 can be white dots on black screens, pulsed laser diodes, Xenon flashes, or modulated lasers, etc. — anything that allows unambiguous detection in all circumstances.

The camera system 10 functions in a manner similar to that described in U.S. Pat. No. 4,219,847 (L. Pinckney et al). As data on the tractor is obtained, it is communicated via a radio transmitter 25 to microcomputer 6 or an external computer 30 having overall control of the operation.

Data from camera system 10 so obtained allows determination of tractor location in all axes at all times from a single vantage point. To be useful in general, however, the camera 10 must rotate and track the tractor and perform a co-ordinate transformation using the rotational position and target data to convert guidance signals to the tractor into cartesian coordinate typical of most fields. Motorized, encoded base 12 and mount 13 are provided for this purpose.

Clearly, one such rotatable camera 10 could be used to track may different tractors in a large field.

Such a tracking system (or even a simpler one) provides that the tractor(s) will not run away. It also allows foreign objects to be seen from a more global view and appropriate tractor commands provided to avoid them. It further allows the attitude of the implement or tractor to be determined and unusual conditions corrected.

In addition, camera 10 and its associated computer system can be used to replace the tractor mounted camera 5 altogether. While less preferred than a combination of both 'local' and 'global' views, in many cases (e.g. flat, unobstructed land) a single overall view is enough — particularly if camera 10 is high enough off the ground. The camera 10 can be equipped with both target and gray level field sensing capabilities (and can even be more than one camera unit if need be, with more than one lens). Cameras such as 5, 10 or 215 can also be equipped with microchannel or othere image intensifiers 8 to provide operation in low light level conditions, e.g. at night. These can also be used to 'gate' the sensing with pulsed light sources such as lasers or flash guns, if used.

Clearly, the invention can be used to control other machines such as excavators, bulldozers, road graders, and the like.

Figure 4:
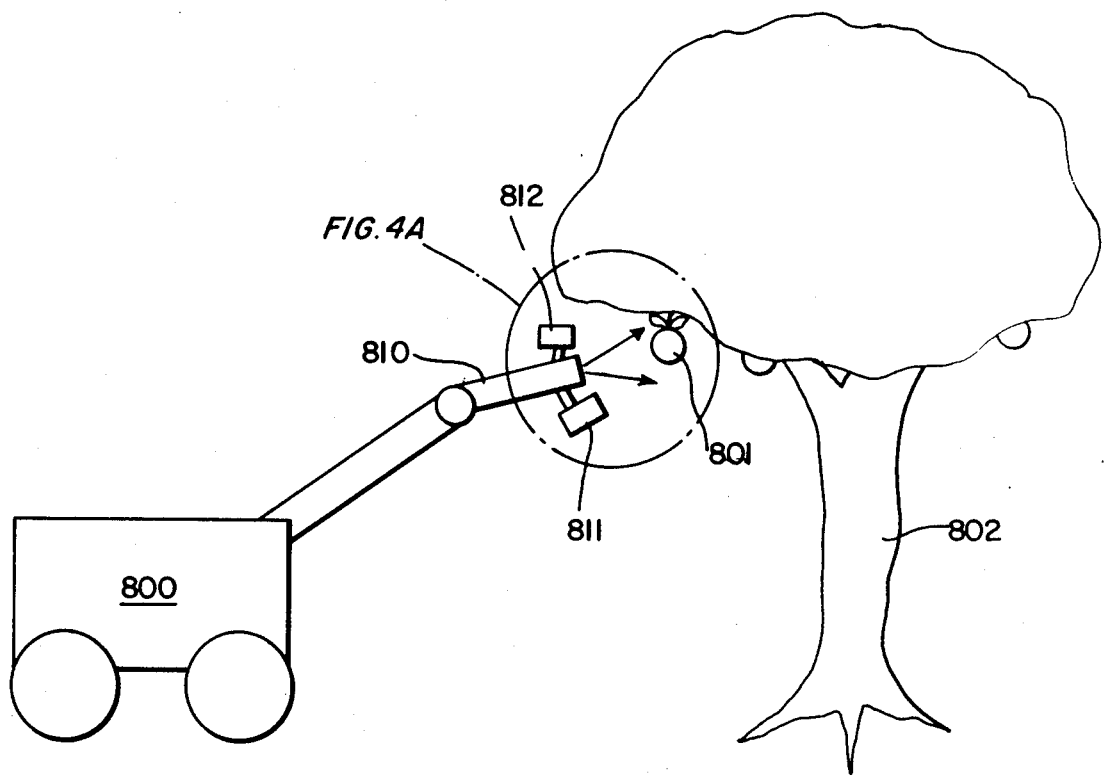
FIG. 4 is a schematic representation of a robot picking device according to the present invention.
Figure 4A:
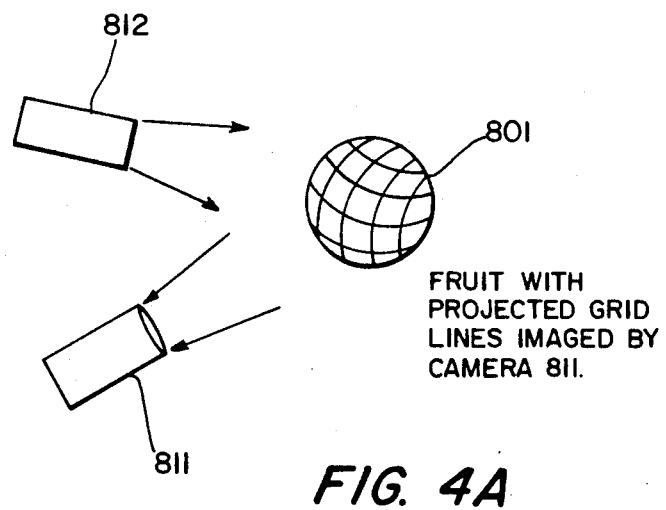
FIG. 4A is an enlarged view of the grid projection depicted in FIG. 4.

The embodiment of FIG. 4 shows a robot picking machine 800 used to pick fruit 801. The fruit is in trees 802 and the picker is intended to utilize a commercial robot electrically controlled having 5 or 6 axes of motion to actually do the picking. This picker contains an optical sensor unit 810 such as the camera shown which looks for the correct fruit etc. to pick.

The sensor 810 is composed of a TV camera 811 in color or with separate color sensors as well as a line or grid projection system 812. As it approaches a potential candidate for picking, grid projection system 812 projects a line or grid onto it and can immediately see if it is of the right curvature and size by scanning the contoured image of the line or grid on the fruit. This same approach is by no means limited only to fruit and can be used with more complexity for picking tobacco and other hard to pick items as well.

Once the optical signal has locked the unit onto the part, the hand goes and grabs it. For this reason, it is desired to build the optical sensors into the hand in some cases or to ride along with the hand with the robot. This has been described in a copending application on robotic applications (U.S. Ser. No. 348,803). To aid in picking, targets as previously described can be placed on the tree limbs near the fruit to allow the unit to more easily find the correct position.

Depicted in FIG. 5 is an alternative embodiment in which a tractor 500 is guided through a field 502 using a target board 504. As shown, target board 504 is placed at one end of field 502 generally in the direction of travel of tractor 500. It is anticipated that target board 504 would be viewable from tractor 500 anywhere in the field by a camera 506 mounted to tractor 500. Camera 506 is of the type which is derived from the abovementioned Pickney et al patent. Camera 506 is capable of locking onto target 500 and to generate 6 degrees of freedom signals of the tractor position relative to the target. To accomplish this, a minimum of three targets are needed. As shown, target board 504 includes four targets 508a, 508b, 508c, and 508d.

As mentioned above, targets 508a, 508b, 508c, and 508d are suitable for use both day and night. At night, targets 508a, 508b, 508c, and 508d can be comprised by strobe lights Alternatively, flood illumination 510 is provided on tractor 500 and targets 508a, 508b, 508c, and 508d include retro-reflective material.

It should be appreciated that in order to make target board 504 clearly visible from any position in the field, target board 504 must be of sufficient size and located at a sufficient height. In this regard, target board 504 is similar to billboards and the like commonly seen along flat highways in fields adjacent thereto. It is anticipated that targets boards 504 of this type which are 50 feet long and 30 feet high would be suitable. As is clear from the highway, boards of this type are clearly visible from all points in the field.

Also shown mounted on tractor 500 is a ground vision camera 512 which can be used as described above in other embodiments to view the field immediately in front of tractor 500. A microcomputer 514 is also provided with an antenna 516 whereby microcomputer 514 can communicate with a base station (not shown).

Figure 6:
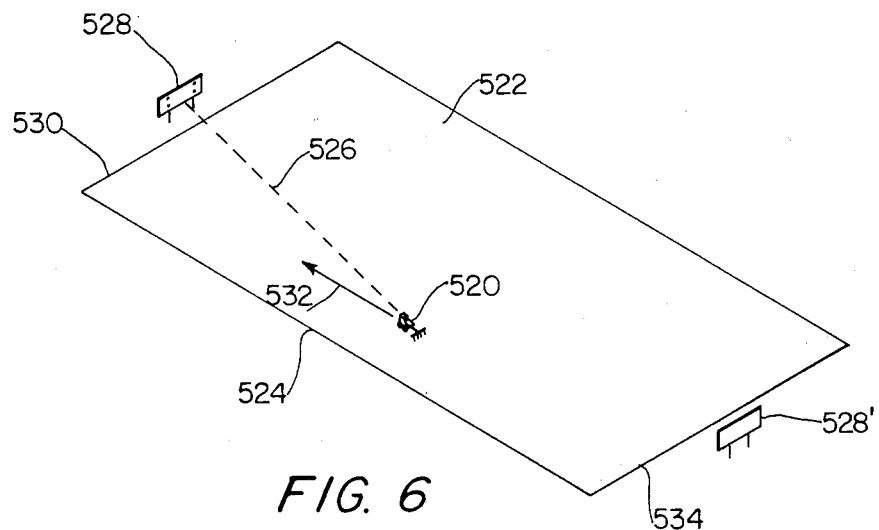
FIG. 6 is a diagrammatic representation of a tractor being guided in a field according to the present invention.

Depicted in FIG. 6 is a tractor 520 plowing in a field 522 adjacent one side 524 of field 522. As shown schematically by dotted line 526, the camera on tractor 520 is imaging a target board 528 located approximately in the middle of an end 530 of field 522. After determining the location of tractor 520, the coordinates in the direction of motion are converted from the measured coordinates through trigonometry to cause tractor 520 to steer along a desired trajectory represented by line 532.

It is clear that all of the relevant features of the field, such as the borders of the field, are known relative to the target board. Therefore, the complete geometry of the field can be preprogrammed in the microcomputer. In this manner, any places in the field which may need to be steered around, such as a pond, a bolder, etc., can be avoided. On the return trip, as tractor 520 heads toward the opposite end 534 of field 522, the camera on tractor 520 views a target board 528′ located at approximately in the middle of end 534.

In an alternative embodiment, instead of using a second target board 528′ as depicted in FIG. 6, only a single target board 528 is used in field 522. Tractor 520 is then provided with a suitable rotating means for rotating the camera located on tractor 520 by 180°. Alternatively, a second camera such as camera 506′ shown on tractor 500 in FIG. 5 can be provided on tractor 520 pointing in the opposite direction as the first camera to view target board 528 on the return trip. In either event, it is noted that at night time it would also be necessary to rotate the flood illumination provided by the tractor or provide a second flood illumination from the opposite direction.

By providing tractor 520 with the ability to rotate the onboard camera 180° or with a second oppositely directed camera, it should also be appreciated that the length of field 522 which can be automatically worked by tractor 520 is doubled. With reference to FIG. 6, it can be seen that tractor 520 can use the camera facing in the reverse direction to view target board 528′ for approximately one half of the length of field 522. At that time, the use of the camera on tractor 520 facing the forward direction and imaging target board 528 can be switched over to and the remaining half of the field worked by tractor 520. The use of two cameras and two target boards in this manner can also provide a redundant measure of the position of tractor 520 if desired.

Figure 8:
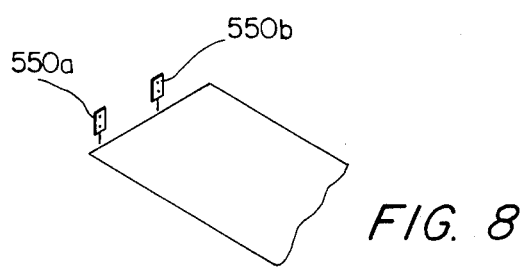
FIG. 8 is a diagrammatic representation of another type of target board for a field according to the present invention.

Since it is desirable to use the camera not only for observation of the target boards, but also to see the general landscape and crops ahead and to the side of the tractor, it is preferred to always have a camera facing in the direction of movement of the tractor. For that reason, the preferred embodiments of the present invention would be the use of a second camera (with the first camera always viewing forward whether viewing the target board or not) and the use of a single forward directed camera with target boards at both ends of the field. It should also be appreciated that although a single large target board has been depicted, other types of target boards are possible. For example, instead of a single target board 504, two separate target boards 550a and 550b could be provided each with a pair of targets similar to target pairs 508a, 508d, and 508b, 508c, respectively, located thereon as depicted in FIG. 8. With this type of board, the separation between the target pairs 508a, 508d, and 508b, 508c could be increased. It would also be possible to locate simple singular targets 552, or even dual targets or quadrant type targets at the end of each row or group of rows in the field as shown in FIG. 9. However, as this would require not only a large number of targets but large enough targets to be viewed from the far end of each row, this embodiment does not seem too practical.

Figure 7:
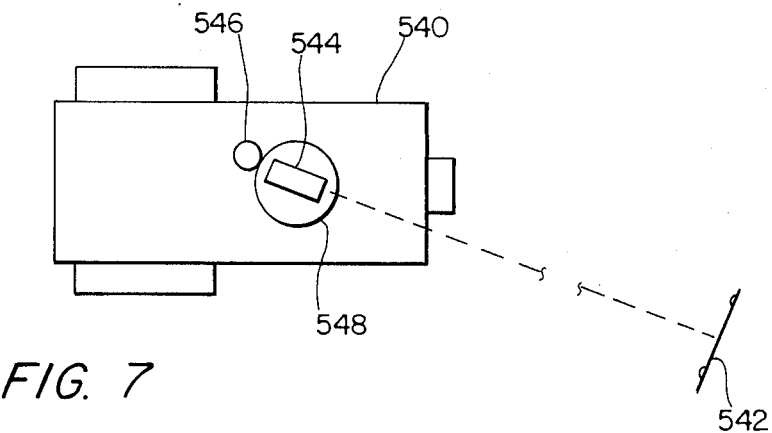
FIG. 7 is a diagrammatic representation of a tractor guided obliquely to a target board according to the present invention.

Depicted in FIG. 7 is still another alternative embodiment of the present invention in which a tractor 540 is moving at an angle to a target board 542. Such a situation can occur when target board 542 is not located at an end of the field but rather on an adjacent side, or where target board 542 is located at an end of the field but the field is not being worked perpendicularly end to end but rather at an angle. A field can be worked at an angle of, for example, 45° for land conservation or other purposes. In such a situation, tractor 540 includes a camera 544 which is rotatably mounted in a horizontal plane relative to tractor 540. Camera 544 is rotated by a motor means 546. A suitable encoder means 548 is also provided to precisely monitor the rotation of camera 544 and to feed this information to the microcomputer. With encoder means 548, it is a simple geometric transformation of the data to determine the exact position of tractor 540 and to determine a desired trajectory.

In order for a target board 542 to be viewed at all times, camera 544 is preferably servo-controlled to keep target board 542 in view at all times. Alternatively, if the camera angle is wide enough, the camera can be just pointed at the angle of travel to target board 542. On the return trip, the camera can be swiveled 180° or another target board can be used in the same manner as described above.

It should also be appreciated that a swiveling camera may also be desirable for tractors which are moving end to end such as tractor 520 depicted in FIG. 6. Where field 522 is sufficiently large, the camera system used on tractor 520 would also include a magnification means for the lens of the camera system. In such a situation, it would be necessary to move the camera on tractor 520 in a horizontal plane as tractor 520 moved across field 522. In such a situation, the field of view of the camera system would be considerably smaller, though it would still be large enough to maintain target board 528 in view in spite of any angular pitches of the tractor which may occur.

When using a servo-system such as described above, the target board would preferably be centered in the field of view of the camera system. As the position of the servo-camera unit would then be known to the computer, the coordinates of the tractor would be adjusted accordingly. The servo-data is also mixed with the data from the target board coordinates to obtain the location of the tractor in up to six axes.

In addition to guiding a tractor in the field, it should also be appreciated that the present invention could be used to guide a tractor to a number of different locations. For example, the tractor could also be guided to enter a barn where the barn is targeted. Plows, hoes, tank trucks, hay wagons, etc., can also be targeted and the tractor suitably guided to these devices as well. Further, the tractor could also be guided down roads which are suitably targeted at crucial points.

Although a target board containing four targets has been described above, it should be appreciated that other target boards are also possible. For example, a long, horizontal target board could be provided with a number of widely spaced, vertical pairs of targets. Initially, from a far away distance, the camera system would image the most widely spaced pair of targets for best resolution. As the tractor approaches the target, the smaller spaced targets could be imaged for even better resolution. A cylindrical lens system can also be used to provide a greater wide angle imaging in the horizontal plane if desired.

It should also be appreciated that a field may contain hills or the like which would obscure the imaging of a target board located at one end of the field. In such a situation, a further target board could be provided at the high points of the field or at other convenient locations which would then be viewable when the targets at the end of the field were not, or in place of said end of field targets. Again, this supplementary target location information would be programmed into the microcomputer. Control would be transferred as necessary from one set of targets to the next as the tractor proceeded in its motion through the field.

A suitable target for day and night use could be a target board 560 having four retro reflective target surfaces 562 located at the corners thereof such as shown in FIG. 10. Inside of the retro reflective surface 562 would be a planar reflective surface 564 such as white painted surface. During daylight, the white painted reflective surfaces 564 would be viewable by the camera system. At night, the retro reflective surface 562 would reflect the light from the illumination means of the tractor and be viewable.

While disclosed relative to guidance of agricultural machinery, the invention is generally applicable to other types of motive machines such as road graders, military vehicles, automobiles, trucks, automatic guided industrial vehicles and the like. In addition, the "field" herein can be broadly construed to include roadways, parking lots, and even expanses of water or air with guidance of aircraft or navel vessels similarly provided. The latter allows automatic landing or takeoff or navigation within harbors, air space, airports, etc.

A highly satisfactory retro reflective target material which can be used with tractor mounted illumination is 3M "Scotchlite" brand type 7610 or 7615 retro reflective sheeting. Plastic or glass "reflex" type retro reflectors such as used on cars can also be used, as of course, can self-luminous targets.

Figure 11:
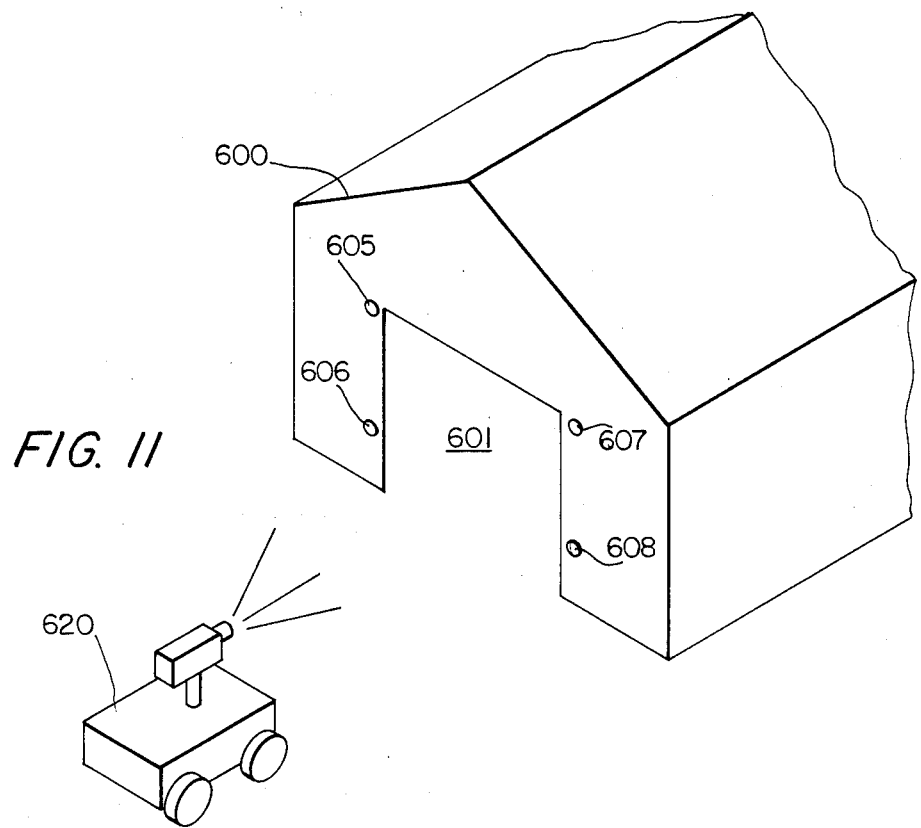
FIG. 11 is a diagrammatic representation of a farm structure having targets for detection.

FIG. 11 illustrates an example wherein a barn or other parking location 600 has its opening 601 marked by targets 605, 606, 607 and 608 at the four corners of said opening or another convenient location. Typically the relative location of the targets to each other and to the opening is known to the microcomputer on tractor 620 which is guiding itself through said opening. From such known target location data, position and angular orientation of the tractor to the barn and opening can be determined.

Figure 12:
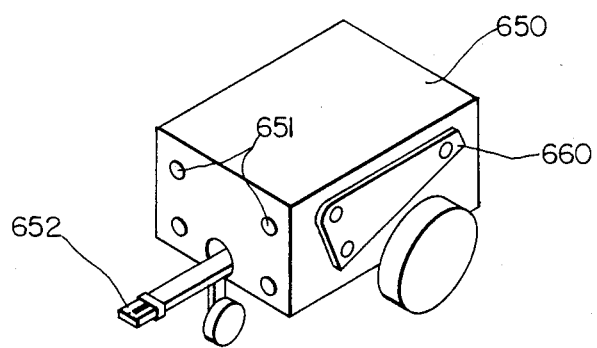
FIG. 12 is a diagrammatic representation of a farm vehicle having such targets.

Similarly, a farm implement or other vehicle such as wagon 650, shown in FIG. 12 can also be so targeted with one or more targets such as 651 with location of target points known with respect to each other and to a hitch 650 or other feature of the wagon. Thus an approach may be made by the tractor to automatically hitch up to the wagon.

Similarly, target points indicative of the location of gasoline hoses, recepticles, etc. can also be used.

Target plates such as 660 located on the side of wagon 650 can be coded in such a way as to differentiate that it is on the side and thus the tractor is programmed to approach from the front. Coding can be with different target arrangements or numbers, eg. the 3 pt. target shown. Alternatively, a regular TV picture of the wagon can be used with standard gray level or color image processing techniques known in the art to determine that the side, not the front, is being approached and indeed it is a wagon at all.

Generally, however, it is preferable to target each vehicle, implement, opening, field boundary or other object which is to be interacted with, with a unique target such that the microcomputer program table can immediately associate the object with a known situation. Ideally, the table would store the target types, dimensions and locations of the target to the features of intent (eg. the hitch) for each of the objects to be encountered.

As mentioned above, this concept can be extended beyond agricultural equipment in fields. For example, small boats can be docked in slips with each slip or well having a target plate of known dimension at its end, or other convenient location referenced to the well dimensions. Similarly, aircraft runways or helicopter pads can be so marked to allow automatically controlled landings (or takeoffs) to occur. This is particularly interesting on unimproved airfields possibly even those with no power such as might be used by wounded fliers, pilots of small planes, harriers or even RPVs (pilotless planes). Such pads could even be ship based, where dynamic relative data can be generated.

Convoys of vehicles, trucks, boats etc. can also be so guided, where a vehicle would follow a first vehicle ahead of it based on location of a target board on the back of the first vehicle in the field of view of a camera on the following vehicle. This reduces the drivers required and frees up combat soldiers for example.

The concept is equally valid in construction work wherein said target boards can be placed in a work area, such as a field, roadway, building or the like, and cameras on the various pieces of machinery (eg. backhoes, graders, trucks, cranes, etc.) used to locate said targets and therefrom determine relative position of the machine to the target and where applicable, to the features of interest of the object to which the target is attached or incorporated.

Indeed, even the building materials such as bricks, blocks, boards, slabs, I beams and the like can be so targeted to allow their rapid pick-up and assembly. To present good appearance, targets in this case ideally would be naturally occuring features of the object such as decorative feature points or the like. Alternatively, the back side (eg. inside surface) or a surface to be subsequently covered up can be so targeted. This concept applies generally to all types of robotic assembly for example.

Figure 4B:
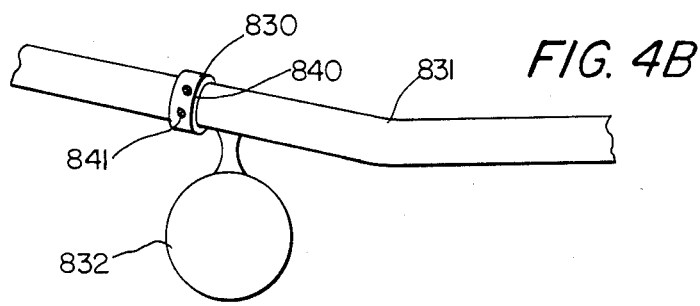

FIG. 4B illustrates a target "band" 830 placed on a fruit tree branch 831 (tobacco stalk, etc.) near the fruit 832 to be picked. Typically, each fruit bearing location on the tree would be so targeted if such location were known. The band is made up for example by a round plastic or metal band 840 with retro reflective dots 841, either a single circumferential row or a double row, to desireably present a 2 or 4 dot matrix to a viewing camera on the picker, which homes in on the targets which are relatively well known in their location to the fruit which can then be found and picked.

These target bands, which could also be polygonal, square or triangular with targets on each side, are general and can be used as well in such objects as robot grippers, weld guns, construction material and any other object which is to be located in space particularly elongate cylindrical objects.

Note that this invention can exist in a semi automatic mode wherein a visual display of desired trajectory or present position or velocity is printed by the computer on a TV screen or equivalent and the human actuates the steering or other controls to affect trajectory correction.

Although the present invention has been described with respect to exemplary embodiments thereof, it will be under stood by those of ordinary skill in the art that variations and modifications can be effected within the scope and spirit of the invention.

The corn row of FIG. 2 is an example of vertical objects in general which are located in horizontal rows, such as fence posts and the like, and the guidance method so illustrated for determining distance and parallelism (i.e. angular orientation) to said row in general for all such situations; for example, an automatic sentry vehicle guarding a fenced perimeter.

I claim:

1. A method for determining the distance of a base to, or the parallelism of a base having a direction of movement relative to, a row of objects located along an axis, comprising the steps of:
   projecting light at an oblique angle to the axis from the base located at one side of the axis so as to illuminate a limited plurality of objects in a row;
   imaging the light from the illuminated objects at a location on the base at an oblique angle different from the illuminating oblique angle;
   detecting the imaged light from the illuminated objects;
   generating a signal representative of the frequency of the images produced by said objects; and
   analyzing said signal to determine the distance to the row or the parallelism of the base relative to the row.

2. A method as claimed in claim 1 wherein said projecting step includes the step of sequentially illuminating objects in the row at a known light projecting angle, and said imaging step includes the imaging of the returned light from the objects sequentially imaged at the known projection angle.

3. A method as claimed in claim 1 wherein said imaging step is performed using a TV camera; and further including the steps of moving the TV camera to view targets located at a known position and determining a position of the base relative to the targets.

* * * * *